(12) United States Patent
J B et al.

(10) Patent No.: US 11,632,176 B2
(45) Date of Patent: Apr. 18, 2023

(54) AUTOMATIC NEGOTIATION OF OPTICAL TRANSCEIVER CONFIGURATION PARAMETERS

(71) Applicant: Juniper Networks, Inc., Sunnyvale, CA (US)

(72) Inventors: Venu J B, Bangalore (IN); Prasanth Kemparaj, Bangalore (IN); Shankarrao Janakiram, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 16/949,494

(22) Filed: Oct. 30, 2020

(65) Prior Publication Data

US 2022/0140908 A1 May 5, 2022

(51) Int. Cl.
*H04B 10/40* (2013.01)
*H04L 1/00* (2006.01)

(52) U.S. Cl.
CPC ........... *H04B 10/40* (2013.01); *H04L 1/0003* (2013.01); *H04L 1/004* (2013.01); *H04L 1/0009* (2013.01); *H04L 1/0025* (2013.01)

(58) Field of Classification Search
CPC ..... H04B 10/40; H04L 1/0003; H04L 1/0009; H04L 1/0025; H04L 1/004
USPC ......................................................... 398/25
See application file for complete search history.

(56) References Cited

U.S. PATENT DOCUMENTS

| 10,673,701 B2 | 6/2020 | Mahadevan et al. |
| 2018/0316436 A1 | 11/2018 | Gao et al. |
| 2019/0029065 A1* | 1/2019 | Park ...................... H04W 48/02 |
| 2020/0204889 A1 | 6/2020 | Lopes Moreira et al. |

FOREIGN PATENT DOCUMENTS

| CN | 101422060 | * | 4/2009 | ............ H04W 28/18 |
| CN | 101764676 | * | 6/2010 | ............... H04L 1/00 |

OTHER PUBLICATIONS

English translation: CN 101764676 A (Year: 2010).*

(Continued)

*Primary Examiner* — Ted M Wang
(74) *Attorney, Agent, or Firm* — Shumaker & Sieffert, P.A.

(57) ABSTRACT

Techniques for negotiating optical configuration parameters of transceivers are disclosed. In one example, a method may include outputting, by a first optical node to a second optical node, a negotiation request message that specifies a configuration parameter setting for optical transceivers, the setting comprising one of a speed, a forward error correction (FEC) scheme, a modulation type, a transmission power, a minimum central frequency, a maximum central frequency, a minimum input power, a maximum input power, or a signal-to-noise ratio threshold; receiving, by the first optical node from the second optical node, in response to the negotiation request message, a negotiation response message including an indication of support for the configuration parameter setting; and configuring, by the first optical node, in response to the indication of support, a configuration parameter of an optical transceiver for the first optical node with the configuration parameter setting for the configuration parameter.

20 Claims, 9 Drawing Sheets

(56) References Cited

OTHER PUBLICATIONS

English translation: CN 101422060 A (Year: 2009).*
Extended Search Report from counterpart European Application No. 21154617.1, dated Jul. 23, 2021, 12 pp.
Response to Communication Pursuant to Rule 69 EPC dated May 10, 2022, from counterpart European Application Mo. 21154617.1, filed Nov. 2, 2022, 27 pp.
"Forward Error Correction (FEC) sublayer for BASE-R PHYs," IEEE Standard for Ethernet, IEEE Std 802.3-2015: Section 5, Clause 74, Mar. 4, 2016, pp. 539-566.

* cited by examiner

AUTOMATIC NEGOTIATION OF OPTICAL TRANSCEIVER CONFIGURATION PARAMETERS

TECHNICAL FIELD

The disclosure relates to computer networks and, more specifically, to determining optical transceiver parameters.

BACKGROUND

Routing devices within a network, often referred to as routers, maintain configuration parameters for sending and receiving information through the network. To facilitate reliable optical network communications, optical transceivers may be configured with configuration parameters that specify forward error correction (FEC) schemes, acceptable signal-to-noise ratios (SNRs), and transmission powers. Such parameters may also include acceptable spectral content, such as minimum and maximum central frequencies, and optical signal modulation schemes.

SUMMARY

In general, techniques are described for automatically negotiating, over an optical link coupling a pair of optical transceivers, optical transceiver configuration parameters used for optical transmissions by the pair of optical transceivers. Optical transceiver configuration parameters may include, for instance, minimum and maximum central frequencies, minimum input power, maximum output power, optical SNR (OSNR), the forward error correction (FEC) scheme, and the modulation scheme. At least some of these configuration parameters should have matching values on both the transmitting and receiving end to enable reliable communication between the pair of optical transceivers.

Optical transceiver configuration parameters may be negotiated between the transmitting and receiving ends via a message exchange involving optical parameter negotiation messages. Initially, a first optical transceiver of a first optical node and a second optical transceiver of a second optical node may be configured with a baseline set of configuration parameter settings for optical communications on a shared optical link. The baseline set of configuration parameter settings may be set as to facilitate reliability of initial communications rather than to optimize the bandwidth on the shared optical link. An initial negotiation request message, sent by the first optical node to the second optical node, may specify one or more possible sets of configuration parameter settings for the first optical transceiver for transmitting optical communications on the shared optical link. The second optical node may determine, from among the one or more possible sets of configuration parameter settings, a supported set of configuration parameter settings for receiving optical communications on the shared optical link. The second optical node responds, with a negotiation response message, to the first optical node with an indication of the supported set of configuration parameter settings. The first optical transceiver and the second optical transceiver are then configured with the supported set of configuration parameter settings, and the first optical node sends optical communications via the shared optical link in accordance with the supported set of configuration parameter settings. The second optical node receives and processes the optical communications via the shared optical link in accordance with the supported set of configuration parameter settings.

In some examples, the techniques include extending an Ethernet management protocol to transport optical parameter negotiation messages as Ethernet frames between a first optical node and a second optical node over the optical link.

The techniques may provide one or more advantages. For example, automatic negotiation of configuration parameters for a shared optical link by optical transceivers may improve the information throughput of the shared optical link and, by extension, of the optical network. For example, if the optical loss in the shared optical link is relatively low, the transmitter and receiver may negotiate a FEC scheme that uses fewer bits because the optical signal is relatively strong, or a higher speed, or both. Additionally, automatic negotiation of configuration parameters may improve the power efficiency of the network. For example, if the optical loss in the shared optical link is low, the transmitter and receiver may negotiate optical parameters that use less power, such as a lower optical transmission power.

In one example, a method comprises outputting, by a first optical node to a second optical node, a negotiation request message that specifies a configuration parameter setting for a configuration parameter for optical transceivers, wherein the configuration parameter comprises one of a speed, a forward error correction (FEC) scheme, a modulation type, a transmission power, a minimum central frequency, a maximum central frequency, a minimum input power, a maximum input power, or a signal-to-noise ratio threshold; receiving, by the first optical node from the second optical node, in response to the negotiation request message, a negotiation response message including an indication of support for the configuration parameter setting for the configuration parameter for optical transceivers; and configuring, by the first optical node, in response to the indication of support, a configuration parameter of an optical transceiver for the first optical node with the configuration parameter setting for the configuration parameter.

In another example, a method comprises receiving, by a first optical node from a second optical node, a negotiation request message that specifies a configuration parameter setting for a configuration parameter for optical transceivers, wherein the configuration parameter comprises one of a speed, a forward error correction (FEC) scheme, a modulation type, a transmission power, a minimum central frequency, a maximum central frequency, a minimum input power, a maximum input power, or a signal-to-noise ratio threshold; outputting, from the first optical node to the second optical node, in response to the negotiation request message, a negotiation response message including an indication of support for the configuration parameter setting for the configuration parameter for optical transceivers; and configuring, by the first optical node, in response to the indication of support, a configuration parameter of an optical transceiver for the first optical node with the configuration parameter setting for the configuration parameter.

In another example, a system comprises a first optical node configured to: output a negotiation request message that specifies a configuration parameter setting for a configuration parameter for optical transceivers, wherein the configuration parameter comprises one of a speed, a forward error correction (FEC) scheme, a modulation type, a transmission power, a minimum central frequency, a maximum central frequency, a minimum input power, a maximum input power, or a signal-to-noise ratio threshold; receive, from a second optical node, in response to the negotiation request message, a negotiation response message including an indication of support for the configuration parameter setting for the configuration parameter for optical transceivers; and configure, in response to the indication of support, a configuration parameter of an optical transceiver for the first optical node with the configuration parameter setting for the configuration parameter; and the second optical node configured to: receive the negotiation request message; output, in response to the negotiation request message, the negotiation response message; and configure, in response to the indication of support, a configuration parameter of an optical transceiver for the second optical node with the configuration parameter setting for the configuration parameter.

The details of one or more examples are set forth in the accompanying drawings and the description below. Other features, objects, and advantages will be apparent from the description and drawings, and from the claims.

BRIEF DESCRIPTION OF DRAWINGS

Like reference characters denote like elements throughout the figures and text.

DETAILED DESCRIPTION

Forward error correction (FEC) is used in a variety of contexts to ensure data signal transmission over "noisy" communication channels. FEC techniques include encoding the original message prior to transmission with redundant data. This data is an error correcting code (ECC), created by an FEC algorithm scheme ("FEC scheme"), that gets forwarded along with the data and decoded by the receiver. On the receiving end, this affords an opportunity to correct errors and reduce the bit-error rate (BER) and increase communication reliability. Because the redundant bits are transmitted across the same paths as the original data they are designed to protect, there is a tradeoff between bit-error and data rates. More reliable codes tend to be more complex, with more redundant bits. By taking up more space in the transmission channel, such codes can result in lower rates of data transmission, even as they improve communication reliability In fiber-optic networking, FEC may be used to mitigate a low OSNR. OSNR may be used to determine how far a wavelength can travel before it needs regeneration, and FEC may be used to extend the travel distance and/or improve information reliability. FEC may be used at high-speed data rates in which advanced modulation schemes may improve OSNR by reducing dispersion and maintaining signal correspondence with the frequency grid. Without the incorporation of FEC, 100G transport may be limited to extremely short distances.

In some examples, an automatic negotiation of FEC modulation schemes used by optical transceivers at a first end of a network link and a second end of the network link may include starting the network link without FEC/modulation and determining to use a FEC/modulation. In some examples, the speed of the link may first be configured. For example, devices at the first end and the second end may support different FEC/modulation schemes at the same speed, and the devices may be configured to exchange the FEC/modulation supported at one or more speeds and determine which FEC/modulation to use. In some examples, if one of the first and/or second devices changes its speed or FEC/modulation, the device may transmit the change it is going to apply and/or has applied to the other device before activating the change such that the other device may adjust itself to the new configuration. Additionally, optical transmitter and receiver powers may be exchanged such that each device may determine the optical power loss of the link and/or distance from the loss. In some examples, a BER may be exchanged. If the BER exceeds a certain level, diagnostic tests, such as a pseudorandom binary sequence (PRBS) test, may be initiated to automatically to check the integrity of the link, and results of the diagnostic tests may be readily available to each device. In some examples, the first device and the second device may exchange parameters via ethernet frames.

Figure 1:
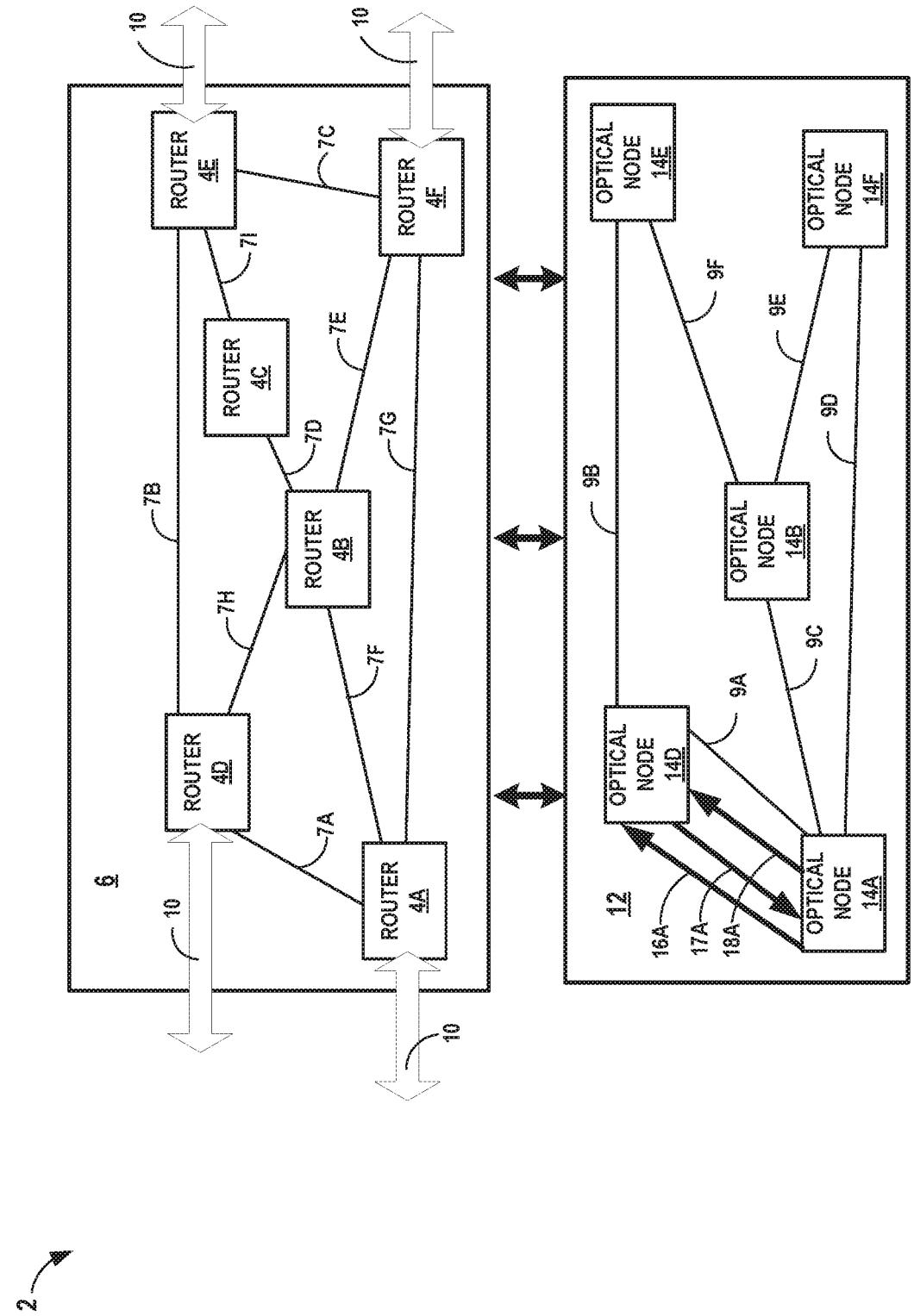
FIG. 1 is a block diagram illustrating an example network system in which optical nodes may automatically negotiate configuration parameters, in accordance with techniques described in this disclosure.

FIG. 1 is a block diagram illustrating an example network system in which optical nodes may automatically negotiate configuration parameters, in accordance with techniques described in this disclosure.

In this example, multi-layer network 2 includes logical network 6 and transport network 12. Transport network 12 represents an optical transport network (OTN) underlying network 6. Network 6 includes routers 4A-4F (collectively "routers 4") to control switching and routing of packet flows. Network 6 may represent an Internet Protocol (IP) network. Examples of routers 4 include layer 3 (L3) routers and layer 2 (L2) switches or L2/L3 switches that collectively provide network 6. That is, network 6 typically provides L2/L3 traffic forwarding services, such as traffic engineering via Multiprotocol Label Switching traffic-engineered (MPLS-TE) including label switched paths (LSPs), Virtual Local Area Network (VLANs), and so forth. Various examples of network 6 may encompass many hundreds or even thousands of routers/switches.

Underlying transport network 12 transports, multiplexes, and switches packet-based communications through high-speed optical fibre links. Transport network 12 may include multiple optical communication devices (e.g., packet-optical transport devices) interconnected via optical links and controlling transmission of optical signals carrying packet data along the optical links. In this way, transport network 12 provides a physical layer that physically interconnects routers 4 of network 6.

Although not shown in FIG. 1 for simplicity, packet-optical transport devices may be, for example, PCXs, wavelength-division multiplexing (WDM)/dense WDM (DWDM), and time-division multiplexing (TDM)-based devices, optical cross-connects (OXCs), optical add-drop multiplexers (OADMs), reconfigurable OADMs (ROADMs), multiplexing devices, or other types of devices or other devices that transmit, switch and/or multiplex optical signals. As one example, routers 4 may be layer three (L3) routers optically connected by intermediate OXCs of transport network 12, such as OXCs to which the routers 4 have access links.

Transport network 12 typically includes a number of other components, such as amplifiers, transponders, OTTs, repeaters and other equipment for controlling transmission of optical packet data along optical links (also not shown). Large optical transport systems may have significant numbers of such devices that influence optical transmissions. Although described with respect to optical links, transport system 12 may include other types of physical links as well, such as Ethernet PHY, Synchronous Optical Networking (SONET)/Synchronous Digital Hierarchy (SDH), Lambda, or other Layer 2 data links that include packet transport capability.

Routers 4 may be members of a path computation domain. The path computation domain may include, for example, an Interior Gateway Protocol (e.g., Open Shortest Path First (OSPF) or Intermediate System-to-Intermediate System (IS-IS)) area, an Autonomous System (AS), multiple ASes within a service provider network, multiple ASes that span multiple service provider networks or constrained shortest-path computations for Label-Switched-Paths (LSPs) based on the available RSVP bandwidth on the network links and the IP-traffic routed via these LSPs. In various examples, different combinations of routers 4 may include member routers of multiple ASes. Network links connecting routers 4 may thus be interior links, inter-AS transport links, another type of network link, or some combination thereof.

Logical network 6 is in effect an overlay network "built on top of" underlying transport network 12. Routers 4 are connected by virtual or logical links (an example topology for which is illustrated in FIG. 1 with links 7A-7I (collectively "links 7")), each of which corresponds to a path in the underlying transport network 12. Each path may include one or more optical fibre links 9A-9F (collectively, "optical links 9") of the transport network 12.

A traffic demand corresponds to an end-to-end traffic flow 10 traversing network 6 from one of routers 4 at the network 6 edge to another of routers 4 at the network 6 edge. In the illustrated example, routers 4A, 4D, 4E, and 4F are logically located at the network 6 edge and thus ingress and/or egress traffic flows 10 for transport across network 6.

The traffic demand may be defined according to an expected traffic bandwidth that is to be routed (or re-routed) by the network 6 from a source node to a destination node. In some cases, the traffic demand may be associated with timing/calendaring information that defines an interval during the expected traffic bandwidth will be received by network 6 for transport. A traffic flow corresponds to one or more network packets that each matches a set of one or more properties. Different packet flows may be classified using different properties and property values. For example, some packet flows may be identified as matching a standard 5-tuple (or subset thereof) consisting of transport layer protocol (e.g., User Datagram Protocol (UDP) or Transmission Control Protocol (TCP), source IP address, destination IP address, source port, destination port. Packet flows may also be distinguishable from one another by application protocol (e.g., LDP, ARP, OSPF, BGP, etc.) and/or MPLS labels, for example.

In the example shown, transport network 12 may include optical nodes 14A-14F (collectively, "optical nodes 14") interconnected by optical links 9. In the illustrated example, each of optical nodes 14 is associated with one of routers 4 of network 6. For example, optical nodes 14 may couple to respective routers 4 via grey optics, in which a router exchanges grey (uncolored) optical signals with a transponder that converts between a grey optical signal and an optical signal at a specific wavelength (color) exchanged with a WDM device. In some examples, one or more pairs of optical nodes 14 and routers 4 may be integrated, e.g., a router having integrated transponders for converting between optical and electrical signals and an integrated optical cross connect (OXC) or WDM device. In some examples, one or more optical nodes 14 do not include an interface with any of routers 4. Such optical nodes may represent OXCs that switch lambdas for optical paths.

In some examples, multi-layer network 2 may include any combination of any of the following architectural models: (1) optical transport network (OTN) layer added to network layer 6 (bypass model); (2) optimized hybrid MPLS+OTN topology; (3) MPLS-only packet transport network; and (4) OTN-only circuit transport network.

Each of optical nodes 14 may represent a PCX, WDM/DWDM device, TDM-based devices, OXCs, OADMs, ROADMs, multiplexing devices, switch, or other types of devices or other devices that transmit, switch and/or multiplex optical signals. A system and/or an administrator of transport network 12 configures optical nodes 14 to switch optical signals along optical paths, each optical path beginning at an optical transmitter and terminating at an optical receiver and each of the optical transmitter and optical receiver being associated with a different one of optical nodes 14 that includes an interface to one of routers 4. (As used herein, an optical transmitter may be a component of an optical transceiver, and an optical receiver may be a component of an optical transceiver.) In this way, routers 4 may exchange packets via optical paths. An optical path may alternatively be referred to as an optical path, a light path, a lambda, or an optical transport network wavelength. Example bandwidths for an optical path may include, e.g., 2.5 Gbps, 10 Gbps, 40 Gbps, 100 Gbps, or 400 Gbps.

Each of optical nodes 14 and optical links 9 exhibits characteristics that affect the optical signal received at an optical receiver for an optical path that includes such optical nodes 14 and optical links 9. In other words, the optical signal received at the receiver may be affected by impairments including transmission and optical switching characteristics of the optical equipment and therefore differs from the optical signal transmitted at the optical transmitter. The following are examples of impairments and optical transmission properties/phenomena that can affect the integrity of an optical signal and determine whether an optical receiver selected for an optical path is capable of accurately converting the optical signal to an electrical signal for transmission to one of routers 4 and routing in the routing layer topology.

Chromatic dispersion (CD) is a property of the glass medium in optical links 9. Because the index of refraction in the glass medium is a function of the wavelength of light, lower frequency wavelengths travel through glass at a different speed than higher frequency wavelengths, which causes smearing of the transmitted signals in the various wavelengths. Transport network 12 may include dispersion compensation components to reduce or remove the chromatic dispersion on one or more of optical links 9. Such dispersion compensation components may be integrated with an inline amplifier. However, such compensation is typically imperfect and at least in such cases chromatic dispersion remains a property of each fibre link 9. The chromatic dispersion value for an optical path is a cumulative property of the optical links 9 and devices that makes up that and therefore accumulates linearly through the contribution of the optical links 9 for the optical path and the contribution (positive, negative, or insignificant/zero) of other optical equipment, such as components of the optical nodes 14, that in part make up the optical path. For the optical systems calculations the chromatic dispersion can be set as a limit so that if the dispersion is outside this range the link is considered unusable—or as an additional impairment component to the overall Noise Factor figure. Because the chromatic dispersion can be positive or negative, it is possible that, e.g., a positive value for the chromatic dispersion above some limit can be compensated by adding a component to add negative dispersion to take the overall values below this limit.

Polarization mode dispersion (PMD) and polarization dependent loss (PDL) result from birefringence of the fibre and orthogonally-polarized optical signal transmission. PMD causes spreading of optical pulses into adjacent bit periods and overlap. PDL is a measure of the peak-to-peak difference in transmission for light with various modes of polarization. PDL is typically defined as a ratio of the maximum and the minimum transmission of an optical device or fibre link with respect to all polarization states. Optical couplers, isolators, wavelength-division multiplexors, and photodetectors commonly exhibit PDL. For the optical systems calculations the PMD, PDL, and/or CD values can be set as a limit so that if they lie outside the tolerances the link is considered unusable. Alternatively or additionally these impairments may be considered as an additional impairment component to the overall Noise Factor/OSNR figure.

The OSNR represents an amount of noise in an optical signal. As with electrical signals, amplification of an optical signal amplifies both the signal and the noise, while attenuation of both the signal and the noise along a fibre applies more significantly to the signal. The OSNR of a signal therefore diminishes along the fibre transmission medium. Each of optical links 9 has a different OSNR value that is dependent on fibre link length and quality.

In accordance with techniques described in this disclosure, pairs of optical nodes 14 may automatically negotiate, over their shared optical fibre link 9, optical transceiver configuration parameters used for optical transmissions by the optical transceivers, of the optical nodes 14, that are coupled to the shared optical fibre link 9.

For example, optical node 14A may include a transceiver coupled to optical fibre link 9A that is coupled to a transceiver of optical node 14D. Optical nodes 14A, 14D thus have shared optical link 9A. Optical nodes 14A, 14D may be configured with baseline configuration parameters for "worst case" OSNR in order to ensure the reliability of link 9A. For example, the baseline (e.g., default) optical parameters and FEC may assume a low OSNR. Alternatively, optical nodes 14A, 14D may establish links 9 without FEC and/or modulation schemes and the links 9 may fail without a sufficient OSNR.

In some examples, optical nodes 14A, 14D may be configured to negotiate, using a message exchange involving optical parameter negotiation messages, optical transceiver configuration parameters for their respective transceivers coupled to the shared optical link 9A, e.g., after communication across the shared optical link 9A for optical nodes 14A, 14D has been established using the baseline configuration parameter settings. For example, optical node 14A may output, to optical node 14D via shared optical link 9A, a negotiation request message 16A that includes one or more possible sets of configuration parameter settings for the optical transceiver of optical node 14A for transmitting optical communications on shared optical link 9A. Each of the possible sets of configuration parameter settings may include one or more values for speeds, FECs, modulations, transmission powers, minimum and maximum central frequencies, minimum input powers and maximum output powers, and OSNR thresholds, for instance.

Optical node 14D receives negotiation request message 16A and may determine if it supports any of the possible sets of configuration parameter settings. If optical node 14D does not support any of the possible sets of configuration parameter settings, optical node 14D may output a negotiation response message 17A that indicates it does not support any of the possible sets of configuration parameter settings. If optical node 14D does support one or more of the sets of configuration parameter settings, optical node 14D may select a supported set of configuration parameter settings and output, in negotiation response message 17A via shared optical link 9A, an indication of the selected, supported set of configuration parameter settings. Optical node 14A may receive negotiation response message 17A and, if the response includes an indication of a selected, supported set of configuration parameter settings, optical node 14A may self-configure using the selected, supported set of configuration parameter settings. Optical node 14A may output a negotiation confirmation message 18A vi shared optical link 9A indicating confirmation by optical node 14A of the selected, supported set of configuration parameter settings. Optical node 14D may also self-configure with the selected, supported set of configuration parameter settings. In some examples, optical node 14D may self-configure before receiving negotiation confirmation message 18A, and in other examples, optical node 14D may self-configure after and/or based on receiving negotiation confirmation message 18A. Optical nodes 14A, 14D may configure their respective transceivers with the selected, supported set of configuration parameter settings. At this point, both optical nodes 14A, 14D have matching configuration parameter settings. As such, optical nodes 14A, 14D may exchange communications via optical link 9A by transmitting, receiving, and processing optical signals according to the set of configured configuration parameter settings.

Although described above primarily with respect to optical nodes 14A, 14D negotiating configuration parameters for transceivers for communication across optical link 9A, the techniques are similarly applicable to other pairs of optical nodes 14 communicating across their respective shared optical links 9.

Figure 2:
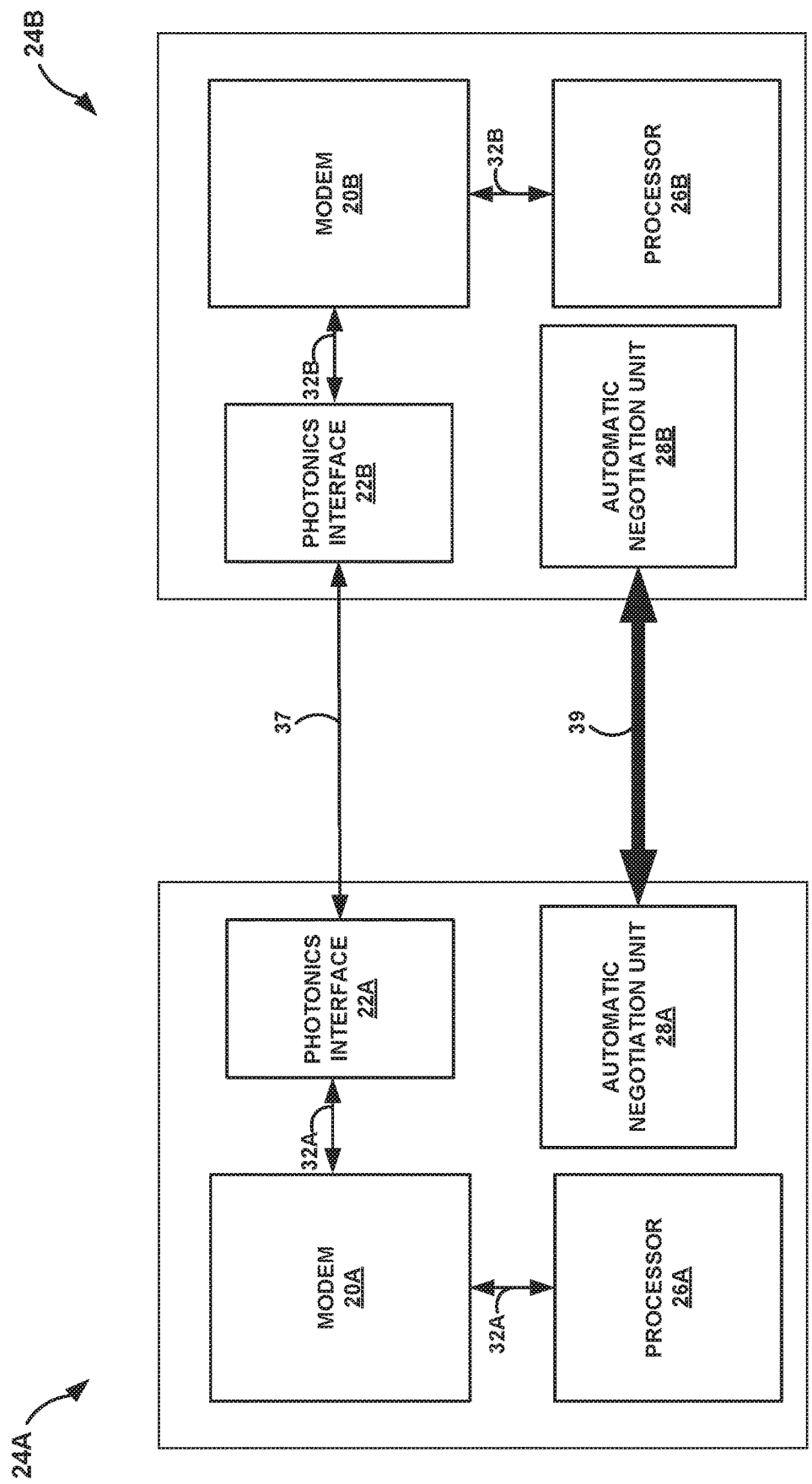
FIG. 2 is a block diagram illustrating a transmitter-receiver and/or transceiver pair in an optical communication system in accordance with one or more examples described in this disclosure.

FIG. 2 is a block diagram illustrating an optical node 24A and an optical node optical node 24B in an optical communication system in accordance with one or more examples described in this disclosure. In some examples, either one or both of optical nodes 24A and 24B may be an example of an optical node 14 of FIG. 1. In the example shown, optical node 24A includes photonics interface 22A coupled to modem 20A and a processor 26A, and automatic negotiation unit 28A. Automatic negotiation unit 28A may represent machine instructions for execution by processor 26A. Photonics interface 22A is a hardware interface that includes components for transmission and reception of optical data. Photonics interface 22A may represent or include an optical transceiver. For example, photonics interface 22A may be a card insertable or pluggable within a chassis for optical node 24A. Examples of modem 20A and processor 26A include, but are not limited to, a digital signal processor (DSP), a general purpose microprocessor, an ASIC, a field programmable gate array (FPGA), a combination thereof, or other equivalent integrated or discrete logic circuitry. For purposes of illustration, modem 20A may be a DSP and processor 26A may be a general purpose microprocessor or an ASIC.

In the example shown, optical node 24B may be substantially similar to optical node 24A. In the example shown, optical node 24B includes photonics interface 22B coupled to modem 20B and a controller, and automatic negotiation unit 28B. Automatic negotiation unit 28B may represent machine instructions for execution by processor 26B. Photonics interface 22B is a hardware interface that includes components for transmission and reception of optical data. Photonics interface 22A may represent or include an optical transceiver. For example, photonics interface 22A may be a card insertable or pluggable within a chassis for optical node 24A. Examples of modem 20B and the controller include, but are not limited to, a digital signal processor (DSP), a general purpose microprocessor, an ASIC, a field programmable gate array (FPGA), a combination thereof, or other equivalent integrated or discrete logic circuitry. For purposes of illustration, modem 20B may be a DSP, and the controller, an example of which is processor 26B, may be a general purpose microprocessor or an ASIC.

Optical nodes 24A and 24B may be a part of an optical communication system such as a wavelength-division multiplexing (WDM) system, including a dense wavelength division multiplexing (DWDM) system. However, aspects of this disclosure are not limited to WDM systems. For purposes of illustration and for ease of description, the examples are described in context of a WDM system.

In a WDM system, modem 20A of optical node 24A receives electrical data streams for transmission. Modem 20A encodes the data streams utilizing any one of a variety of modulation schemes and transmits the modulated data as electrical data streams 32A to photonics interface 22A. Photonics interface 22A may convert the electrical data streams to an optical signal for further transmission via optical link 37.

In a WDM system, photonics interface 22B of optical node 24B receives optical signals via optical link 37 and converts the optical signals to electrical data streams. Modem 20B receives the electrical data streams 32B from photonics interface 22B and demodulates the electrical data streams to generate demodulated electrical data streams. Modem 22B or some other device deserializes the demodulated electrical data stream into a plurality of electrical data streams and transmits each of the plurality of electrical data streams to respective routers and switches. In some examples, both photonic interfaces 22A and 22B may be configured as transceivers and may convert electrical data streams to optical signals and convert optical signals to electrical data streams as described above. While the example of FIG. 2 includes modems 20A and 20B, the articles and techniques described in this disclosure may be used in optical communication systems that may not include a modem, or that may include other components such as a serializer/deserializer (SERDES).

Automatic negotiation unit 28A may include instructions and data for implementing an optical parameter negotiation protocol for automatically negotiating configuration parameters for communications 39 across optical link 37 between optical node 24A and optical node 24B. For example, automatic negotiation unit 28A may include instructions that may be executed by processor 26A to cause photonics interface 22A to output a negotiation request message. The negotiation request message may be in an Ethernet frame according to an Ethernet protocol and may include negotiation configuration parameter settings. The instructions may cause photonics interface 22A to transmit the negotiation request message across link 37 to optical node 24B using baseline configuration parameters. The negotiation configuration parameter settings may include one or more settings of speeds, FECs, modulations, transmission powers, minimum and maximum central frequencies, minimum and maximum input powers, minimum and maximum output powers, OSNR thresholds, and the like. Photonics interface 22B may receive the negotiation request message, and automatic negotiation unit 28B may include instructions that may be executed by processor 26B to determine whether optical node 24B supports any of the configuration parameter settings and to respond in an Ethernet frame across link 37 in the negative if it does not. Automatic negotiation unit 28B may include instructions that may be executed by processor 26B to cause photonics interface 22B to output a negotiation response message with a selection of configuration parameter settings from the negotiation request message if optical node 24B does support one or more of the configuration parameter settings. Photonics interface 22A may receive the configuration response message, and automatic negotiation unit 28A may further include instructions that may be executed by processor 26A to cause photonics interface 22A to output an negotiation confirmation message to optical node 24B. Automatic negotiation units 28A and 28B may further include instructions that may be executed by processors 26A and 26B to cause optical nodes 24A and 24B to self-configure using the confirmed configuration parameter settings.

Figure 3:
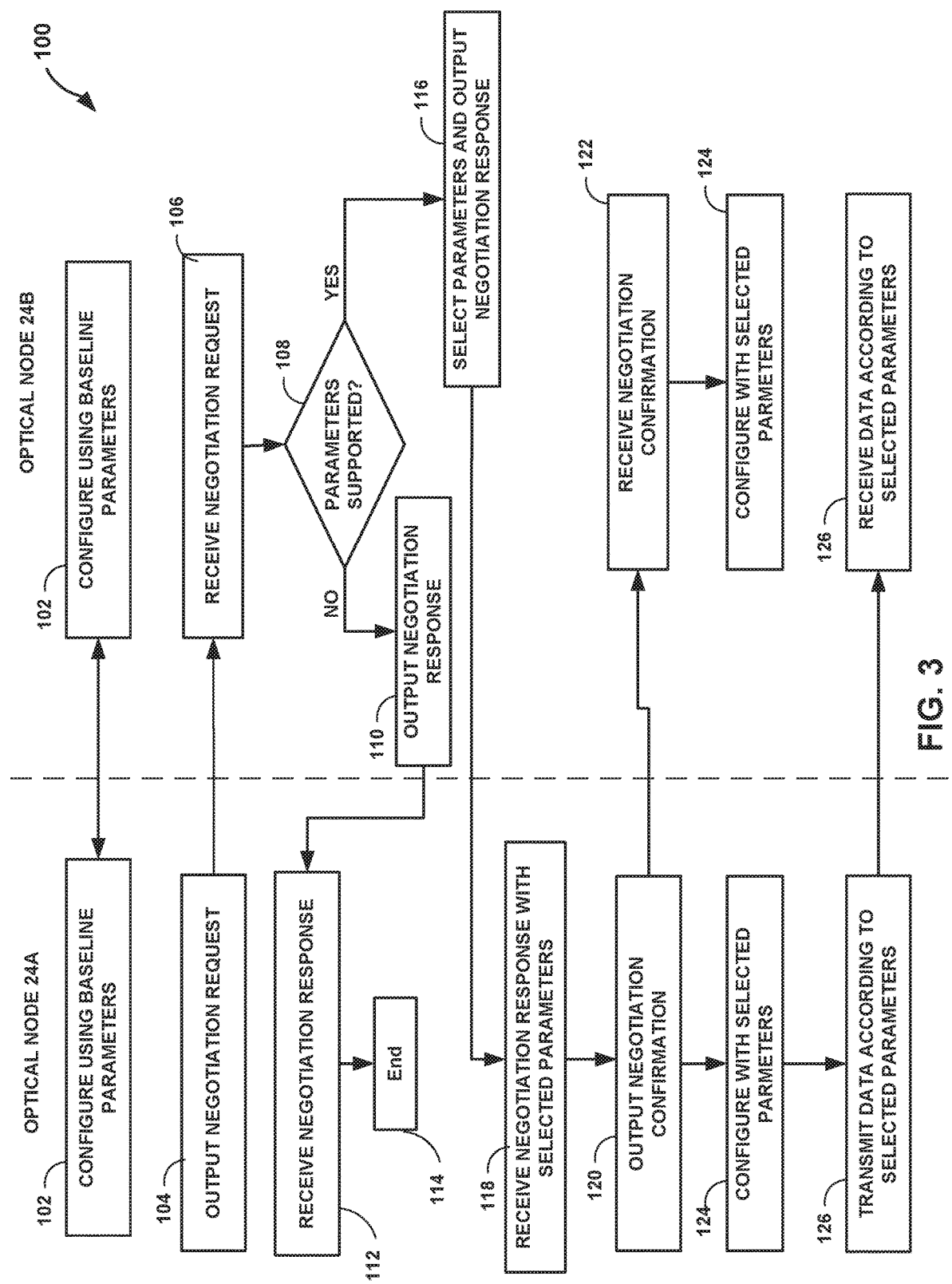
FIG. 3 is a flowchart of an example mode of operations of automatically negotiating configuration parameters in accordance with one or more examples described in this disclosure.

FIG. 3 is a flowchart of an example mode of operation for automatically negotiating configuration parameters using an optical parameter negotiation protocol, accordance with one or more examples described in this disclosure. Operation 100 may be executed by any pair of optical nodes. The method below is described as being executed by optical nodes 24A and 24B but may be executed by any pair of optical nodes.

Optical nodes 24A and 24B may configure using a baseline set of configuration parameter settings (102). Optical nodes 24A and 24B may subsequently transmit communications 39 via optical link 37. Optical node 24A may transmit a negotiation request message, e.g., negotiation request message 200 illustrated and described with reference to FIG. 4, to optical node 24B (104). Negotiation request message 200 may include one or more possible sets of configuration parameter settings.

Optical node 24B may receive the negotiation request message (106). Optical node 24B may determine if it supports any of the possible sets of configuration parameter settings included in the negotiation request message (108). If optical node 24B does not support any of the one or more of the sets of configuration parameter settings, optical node 24B may output a negotiation response message, e.g., negotiation response message 300 illustrated and described below with reference to FIG. 5, with a message field indicating that none of the sets of configuration parameter settings are supported. For example, none field 302 may be a one-byte data field that may contain a "true" value, e.g., "11111111", indicating that none of the configuration parameter settings are supported and/or are otherwise rejected by optical node 24B. Optical node 24A may receive the negotiation response message (112), and both optical nodes 24A and 24B may communicate using the current and/or baseline configuration parameter settings, and the operation ends (114).

If optical node 24B does support one or more of the configuration parameter settings of the sets of configuration parameter settings, optical node 24B may select a set of configuration parameter settings included in the negotiation request message and output a negotiation response message that indicates the selected set and optionally a separate message field indicating that a set of the configuration parameter settings are supported and selected (116). For example, none field 302 may contain a "false" value, e.g., "00000000", indicating that "none supported" is "false," and fields 216-232 may contain the selected set of configuration parameter settings to indicate the supported, selected set of configuration parameter settings.

Optical node 24A may receive the negotiation response (118) and may output a negotiation confirmation message (120), e.g., negotiation confirmation message 400 illustrated and described below with reference to FIG. 6. Optical node 24B may receive the negotiation confirmation message (122).

Optical nodes 24A and 24B may self-configure using the selected set of configuration parameter settings (124), and subsequent communications may use the selected set of configuration parameter settings negotiated between optical nodes 24A and 24B. In some examples, optical node 24A may output the negotiation confirmation message at step 120, and optical node 24B may receive the negotiation confirmation message at step 122, using the selected set of configuration parameter settings, and in other examples the baseline configuration parameter settings may be used to send and receive the negotiation confirmation message at steps 120, 122, e.g., optical nodes 24A and 24B may self-configure, including respective transceivers, using the selected set of configuration parameter settings after confirmation steps 120, 122. Optical node 24A may send data, via modem 20A and photonics interface 22A operating according to the set of selected configuration parameter settings, and optical node 24B may receive data, via modem 20B and photonics interface 22B operating according to the selected set of configuration parameter settings (126).

Figure 4:
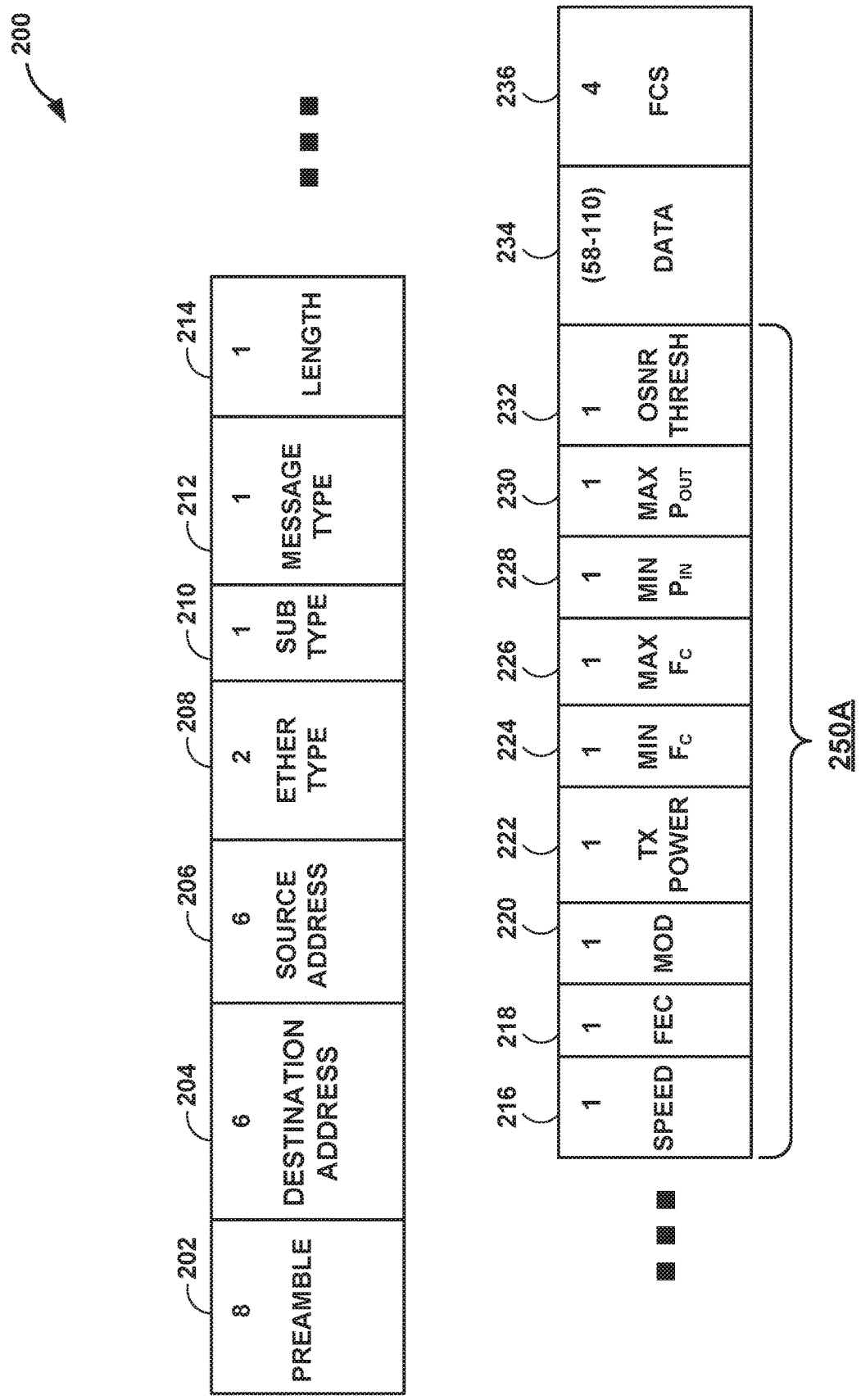
FIG. 4 is a block diagram illustrating an example negotiation request message frame format in accordance with one or more examples described in this disclosure.

FIG. 4 is a block diagram illustrating an example negotiation request message 200 for an optical parameter negotiation protocol, in accordance with one or more examples described in this disclosure. Negotiation request message 200 may be, for example, an Ethernet frame that conforms to a management protocol extended as described herein. For example, the IEEE 802.3 committee has classified two Ethernet management protocols, e.g., fast and slow. The fast protocol may be implemented at the hardware architecture level to prioritize speed, while the slow protocol may be implemented at the software/firmware level to prioritize flexibility. Negotiation request message 200 may be an example of a negotiation request message in a slow Ethernet protocol extended, in accordance with techniques of this disclosure, to include optical parameter negotiation protocol data fields.

Negotiation request message 200 may include fields 202-236, and each field having a length in bytes (as illustrated in FIG. 4) and containing a value indicating a setting for a parameter associated with the field. Fields 202-236 include header fields 202-214. In the example shown, negotiation request message 200 includes preamble 202, which includes eight bytes that may contain data providing bit-level synchronization and allowing devices on the network to synchronize receiver clocks. Destination address 204 may represent a media access control (MAC) address of the interface for the destination optical node for negotiation request message 200. Source address 206 may represent a media access control (MAC) address of the source interface for the transmitting optical node. EtherType 208 may include two bytes and may contain a value specifying the slow protocol. SubType 210 may include one byte that indicates request message 200 is for an optical parameter negotiation protocol. For example, the IEEE 802.3 committee has reserved and specified the first eleven SubType values, e.g., values 0-10 are used. Subtype 210 may use a predetermined value of "11" to specify the Ethernet message as an optical parameter negotiation protocol message. In some examples, the combination of the EtherType 208 and SubType 210 values may indicate that the message is an Ethernet management protocol message and for an optical parameter negotiation protocol, e.g., for negotiation and/or determination of optical configuration parameter settings.

Message type 212 may include one byte that may contain a value indicating the particular type of optical parameter negotiation message, e.g., in the example illustrated in FIG. 4, a negotiation request message 200. In some examples, there may be at least six optical parameter negotiation messages, as shown below in Table 1:

TABLE 1

| Message Type | Value |
| --- | --- |
| Negotiation Request | 00 |
| Negotiation Response | 01 |
| Negotiation Confirmation | 02 |
| Configuration Update | 03 |
| Configuration Query | 04 |
| Configuration Answer | 05 |

In the example shown, negotiation request message 200 may include a message type 212 value of 00. Length 214 may include one byte and may include a value denoting the number of bytes following that include configuration parameter data and/or settings.

Negotiation request message 200 may include a set of configuration parameter settings 250A that are possible for the sending optical node. In the example shown, set of configuration parameter settings 250A includes a speed 216, a FEC 218, a modulation 220, a transmission power 222, a minimum central frequency 224, a maximum central frequency 226, a minimum input power 228, a maximum input power 230, and an OSNR threshold 232, each of which may be 1 byte and include a value denoting a particular setting. For example, speed 216 may specify a type of speed such as 100G, 200G, 400G and the like. In some examples, a value of 00 in the speed 216 field may be the value for a 100G speed, a value of 01 may be the value for a 200G speed, the value 02 may be the value for a 400G speed, etc. FEC 218 may contain a value representing a FEC scheme for the speed denoted in speed 216. Modulation 220 may contain a value representing a type of modulation, transmission power 222 may contain a value representing an optical power in decibel based units, e.g., dBm. The maximum/minimum central frequencies 224 and 226 and the maximum/minimum input powers 228 and 230 may each contain a value representing the minimum/maximum optical central frequency and optical power supported by the optical node, e.g., optical node 24A. The OSNR threshold 232 may contain a value representing a threshold OSNR of optical node 24A.

In some examples, negotiation request message 200 may include multiple sets of configuration parameter settings 250A that are each a different possible set of configuration parameters settings for the sending optical node. For example, optical node 24A may transmit multiple configuration parameters settings for one or more configuration parameters. In some examples, the parameter fields comprising configuration parameter settings 250A repeat themselves, e.g., 250B, 250C, etc. (not shown). In some examples, each configuration parameter settings 250A, 250B, 250C, etc., includes at least one parameter field 216-232 that contains a different value indicating a different setting. The additional configuration parameter settings 250B, 250C, etc., may occupy data 234. Any unused space in data 234 may be filled in with zeros in some examples, or all ones in other examples. In some examples, length 214 denotes the length of all of the configuration parameter settings 250A, 250B, 250C, etc. For example, if negotiation request message 200 includes three configuration parameter settings, e.g., 250A, 250B, 250C, length 214 would be 27, indicating that there are three parameter sets that are each nine bytes in length.

Data 234 may include the rest of the unused space of negotiation request message 200. In some examples, additional configuration parameter settings, e.g., 250B, 250C, etc., may use the space of data 234. In some examples, the unused space of data 234 may be set to all zero values, or all one values, e.g., each byte is all zeros or all ones. Frame check sequence (FCS) 236 may include an error-detecting code.

Figure 5:
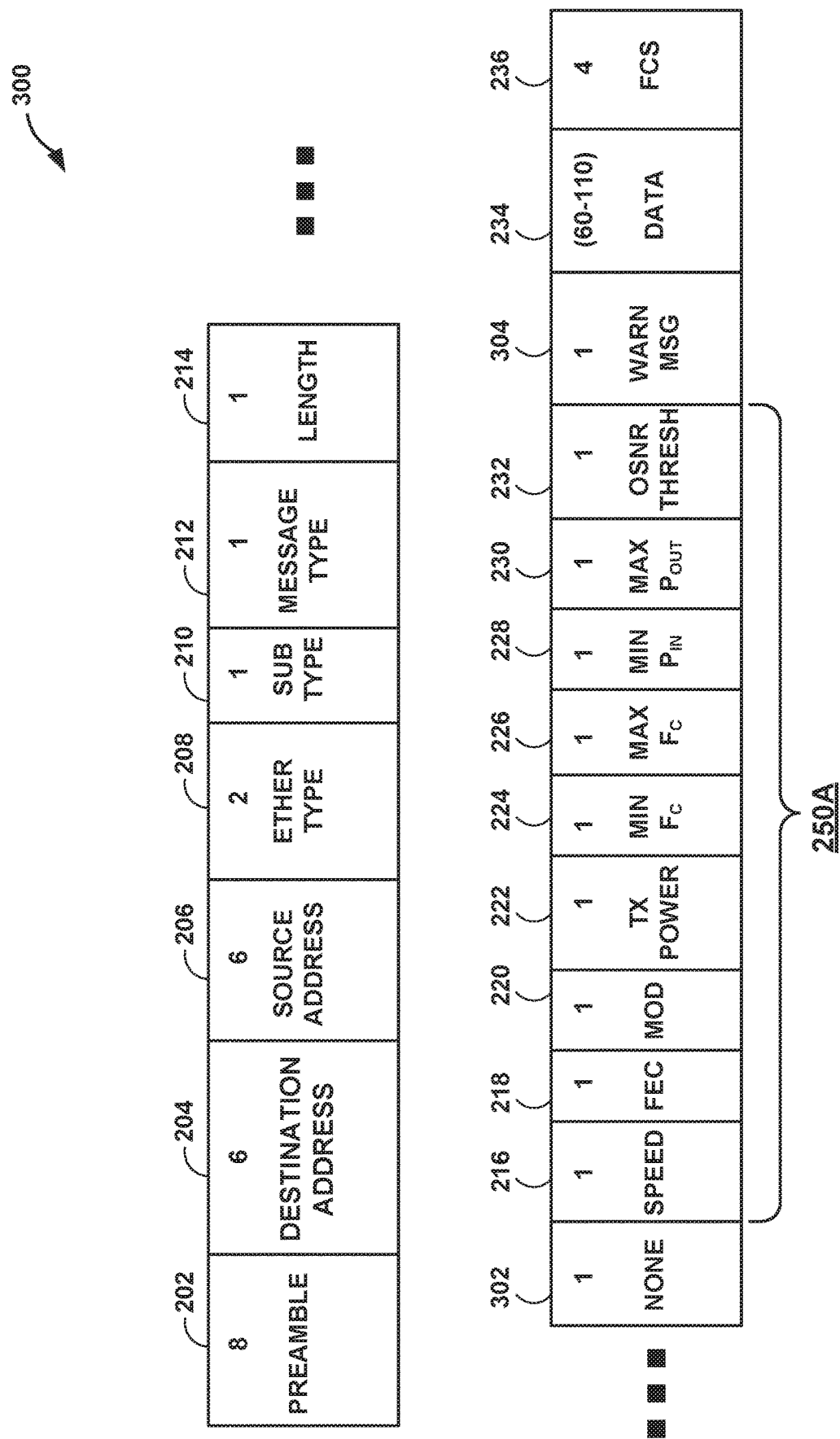
FIG. 5 is a block diagram illustrating an example negotiation response message frame format in accordance with one or more examples described in this disclosure.

FIG. 5 is a block diagram illustrating an example negotiation response message 300 for an optical parameter negotiation protocol, in accordance with one or more examples described in this disclosure. Negotiation response message 300 may be similar to negotiation request message 200, with the difference being the content of some of the message fields. For example, negotiation response message 300 may be an Ethernet frame that conforms to a management protocol extended as described herein.

Negotiation response message 300 may include fields 202-236 as described above with reference to FIG. 4. Negotiation response message 300 may include support indication field 302, e.g., labeled on "none." Indication field 302 may contain a value representing whether optical node 24B supports any of configuration parameter settings included in negotiation request message 200. If optical node 24B does support any of the configuration parameter settings, negotiation response message 300 may include a selected set of configuration parameter settings 250A. Negotiation response message 300 may include warning message 304, which may contain a value representing that optical node 24B is aware of the configuration parameter settings request and whether optical node 24B is able to service any of the requested configuration parameter settings. If optical node 24B does not support any of the requested configuration parameter settings, negotiation response message 300 may not include set of configuration parameter settings 250A and/or warning message 304.

Figure 6:
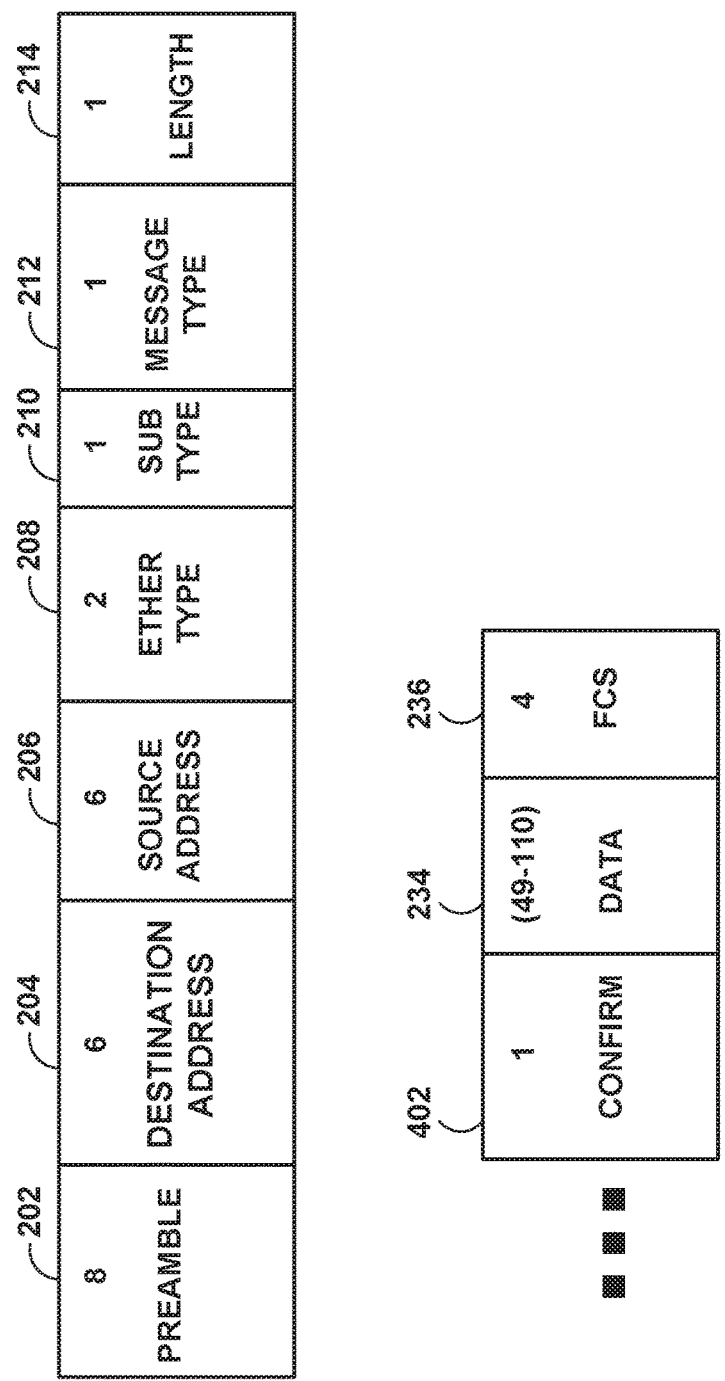
FIG. 6 is a block diagram illustrating an example negotiation confirmation message frame format in accordance with one or more examples described in this disclosure.

FIG. 6 is a block diagram illustrating an example negotiation confirmation message 400 for an optical parameter negotiation protocol, in accordance with one or more examples described in this disclosure. Negotiation confirmation message 400 may be substantially similar to negotiation request message 200, with the difference being the content of some of the message fields. For example, negotiation confirmation message 400 may be an Ethernet frame may be an Ethernet frame that conforms to a management protocol extended as described herein.

Negotiation confirmation message 400 may include fields 202-214 and 234-236 as described above with reference to FIG. 4. Negotiation confirmation message 400 may include confirm field 402, which may contain a value representing optical parameter negotiation success and/or failure.

Figure 7:
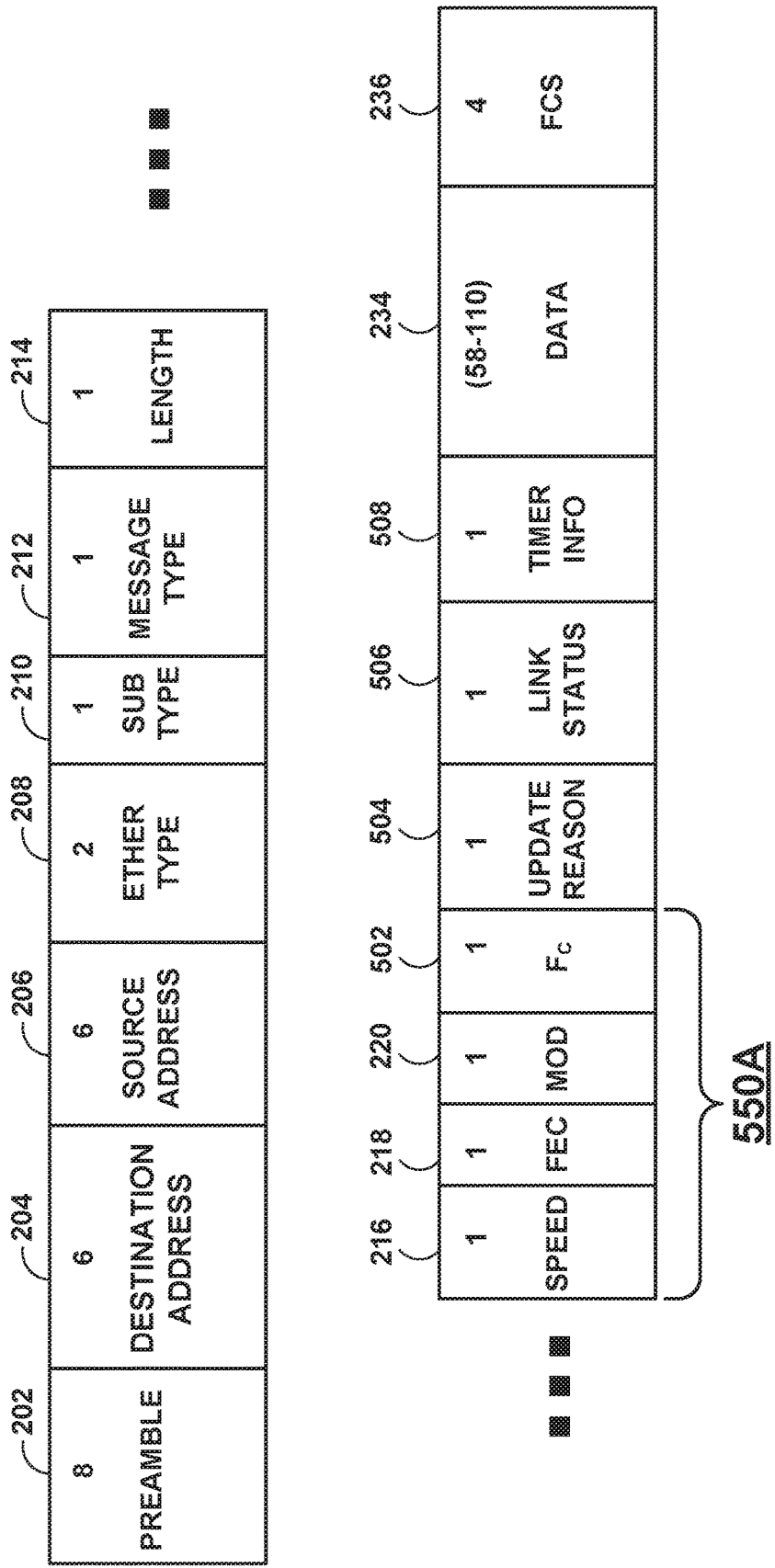
FIG. 7 is a block diagram illustrating an example negotiation update message frame format in accordance with one or more examples described in this disclosure.

FIG. 7 is a block diagram illustrating an example negotiation update message 500 for an optical parameter negotiation protocol, in accordance with one or more examples described in this disclosure. Negotiation update message 500 may be substantially similar to negotiation request message 200, with the difference being the content of some of the message fields. For example, negotiation update message 500 may be an Ethernet frame that conforms to a management protocol extended as described herein. In some examples, negotiation update message 500 may be used to inform the other of optical nodes 24A or 24B of changes to configuration parameter settings before the changes take place.

Negotiation update message 500 may include fields 202-220 and 234-236 as described above with reference to FIG. 4. Negotiation update message 400 may include central frequency 502, which may contain a value representing an optical central frequency setting. For example, the minimum and maximum central frequencies supported by the first and second optical nodes 24A and 24B may be known via negotiation request message 200 and negotiation response message 300, and central frequency 502 may indicate a change of the central frequency between coherent optical transceivers, e.g., tunable optical transceivers.

Negotiation update message 500 may include an update reason 504, e.g., a configuration change, an unacceptable BER, and unacceptable OSNR, and the like. Negotiation update message 500 may include link status 506. For example, link status 506 may contain a value indicating the link may be about to go down because optical node 24A is going to change the configuration parameter settings. Negotiation update message 500 may include timer information 508. For example, coherent optical nodes 24A and 24B may take several seconds to change configuration parameter settings, and timer information 508 may notify the other end of the link, e.g., the other of optical node 24A or 24B, of time information such as how long updating configuration parameter settings may take and at what time the update to the configuration parameter settings may occur. In some examples, it may be useful to shorten the outage time of the link, e.g., such that both optical nodes 24A and 24B may be re-configured at the same time to reduce downtime.

Figure 8:
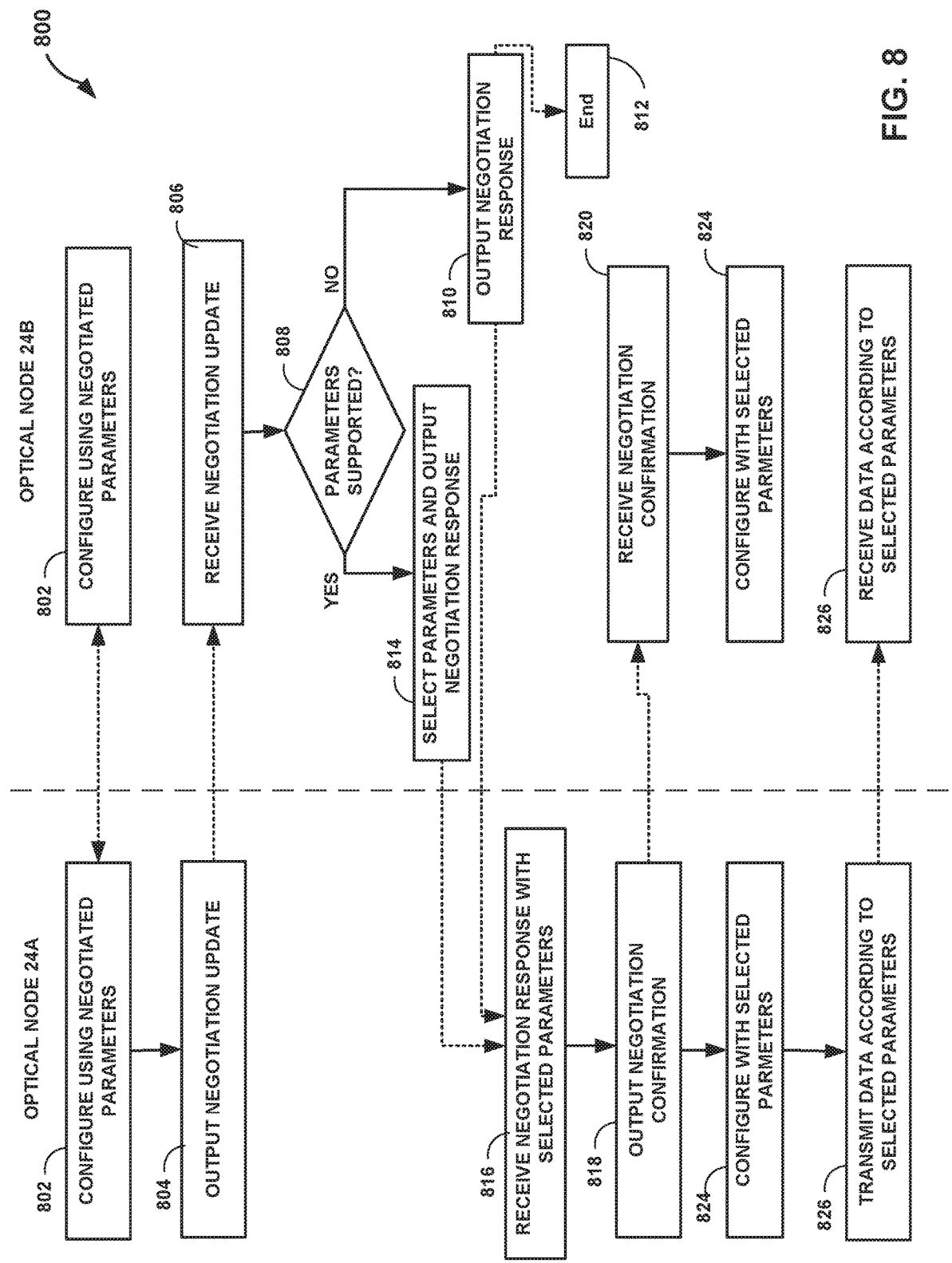
FIG. 8 is a flowchart of an example method of automatically updating negotiated configuration parameters using an optical parameter negotiation protocol, accordance with one or more examples described in this disclosure.

FIG. 8 is a flowchart of an example method 800 of automatically updating negotiated configuration parameters using an optical parameter negotiation protocol, accordance with one or more examples described in this disclosure. The method of FIG. 8 may be executed by any pair of optical nodes. The method below is described as being execute by optical nodes 24A and 24B but may be executed by any pair of optical nodes.

Optical nodes 24A and 24B may configure using a negotiated set of configuration parameter settings, e.g., configuration parameter settings previously negotiated via operation 100 (802). Optical node 24A may transmit a negotiation update message, e.g., negotiation update message 500 illustrated and described with reference to FIG. 7, to optical node 24B (804). Negotiation update message 500 may include one or more sets of configuration parameter settings, e.g., set of configuration parameters 550A.

Optical node 24B may receive the negotiation update message (806). Optical node 24B may determine if it supports any of the possible sets of configuration parameter settings included in the negotiation update message (808). If optical node 24B does not support one or more of the sets of configuration parameter settings, optical node 24B may output a negotiation response message, e.g., negotiation response message 300 illustrated and described below with reference to FIG. 5, with a message field indicating that none of the configuration parameter settings are supported. For example, none field 302 may be a one-byte data field that may contain a "true" value, e.g., "11111111", indicating that none of the configuration parameters are supported and/or are otherwise rejected by optical node 24B. The method may end for optical node 24B, e.g., without updating (812).

If optical node 24B does support one or more of the sets of configuration parameter settings, optical node 24B may output negotiation response message 300 a message field indicating that one or more configuration parameter setting of the set of the configuration parameter settings are supported (814). For example, none field 302 may contain a "false" value, e.g., "00000000", indicating that "none supported" is "false," and fields 216-232 may contain the selected set of configuration parameter settings.

In some examples, whether supported or not by optical node 24B, optical node 24A may receive the negotiation response (816), and may output a negotiation confirmation message (818), e.g., negotiation confirmation message 400 illustrated and described below with reference to FIG. 6. Optical node 24B may receive the negotiation confirmation message (820). If optical node 24B does not support the updated configuration parameter settings, optical node 24B may do nothing.

Optical nodes 24A and 24B may self-configure using the updated set of configuration parameters (822), and subsequent communications may use the updated set of configuration parameters. Optical node 24A may send data according to and/or using the set of updated configuration parameters, and optical node 24B may receive data according to and/or using the updated set of configuration parameters (824).

Figure 9:
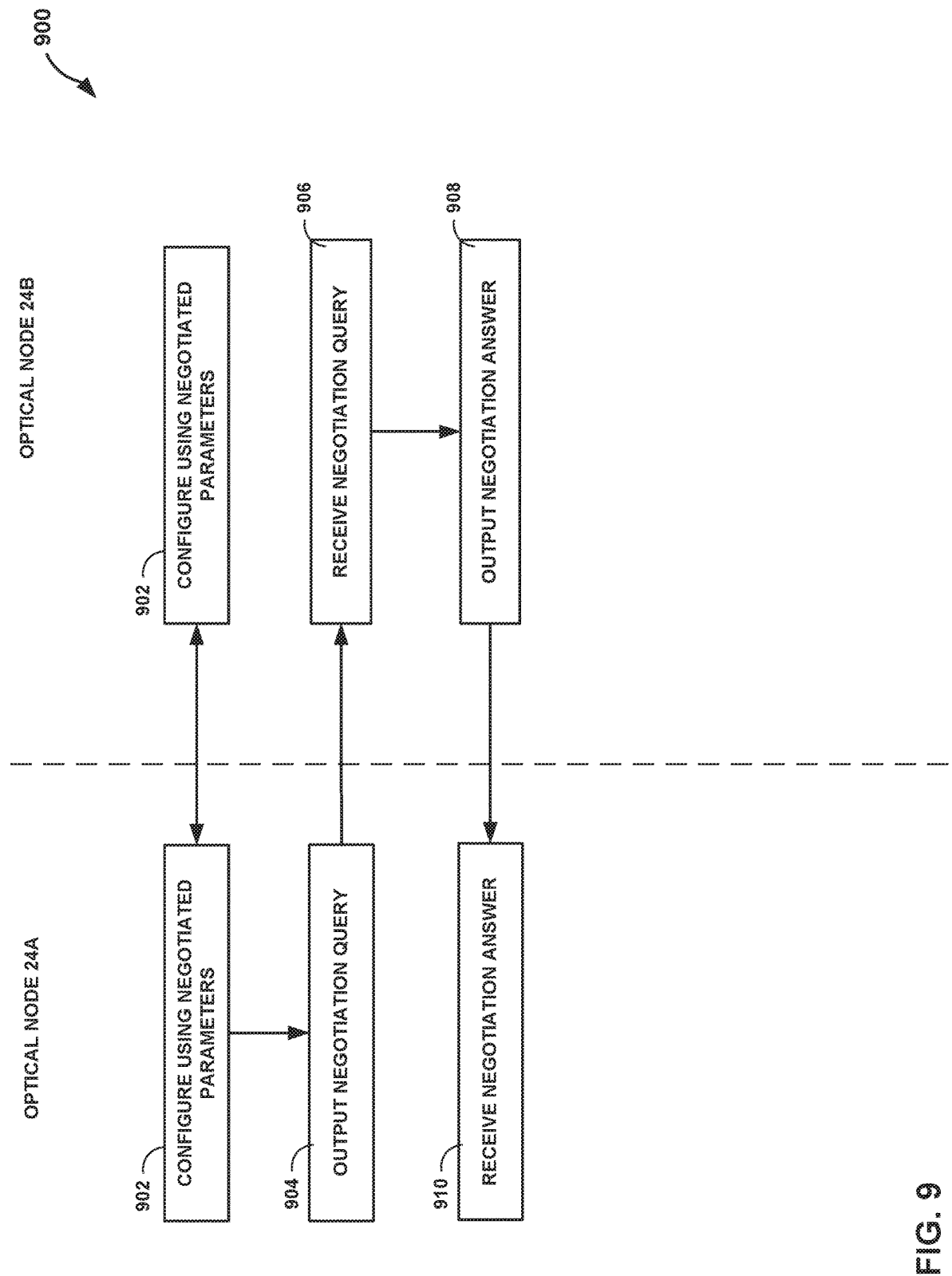
FIG. 9 is a flowchart of an example method of automatically updating negotiated configuration parameters using an optical parameter negotiation protocol, accordance with one or more examples described in this disclosure.

FIG. 9 is a flowchart of an example method 900 of automatically updating negotiated configuration parameters using an optical parameter negotiation protocol, accordance with one or more examples described in this disclosure. The method of FIG. 9 may be executed by any pair of optical nodes. The method below is described as being execute by optical nodes 24A and 24B but may be executed by any pair of optical nodes.

Optical nodes 24A and 24B may configure using a negotiated set of configuration parameter settings, e.g., configuration parameter settings previously negotiated via method 100 (902). Optical node 24A may transmit a negotiation query message (904). In some examples, the negotiation query message may be substantially similar to negotiation request message 200 illustrated and described with reference to FIG. 4, but with message type 212 containing a value of "04" corresponding to a configuration query message type as shown in Table 1 above. The negotiation query message may include one or more sets of configuration parameter settings, e.g., set of configuration parameters 250A.

Optical node 24B may receive the negotiation query message (906). Optical node 24B may determine its current set of configuration parameter settings. Optical node 24B may output a negotiation answer message (908). In some examples, the negotiation answer message may be substantially similar to negotiation request message 200 illustrated and described with reference to FIG. 4, but with message type 212 containing a value of "05" corresponding to a configuration answer message type as shown in Table 1 above. The negotiation answer message may include one or more sets of configuration parameter settings, e.g., the current set of configuration parameters 250A used by optical node 24B. Optical node 24A may receive the negotiation answer message (910). In some examples, the method 900 may improve troubleshooting and reduce downtime via enabling the optical nodes, e.g., optical nodes 24A and 24B, to check their current configuration parameter settings via method 900, and then reset their configuration parameter settings via method 100 or update their configuration parameter settings via method 800.

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

What is claimed is:

1. A method comprising:
   outputting, by a first optical node to a second optical node, a negotiation request message that specifies a configuration parameter setting for a configuration parameter for optical transceivers, wherein the configuration parameter comprises one of a speed, a forward error correction (FEC) scheme, a modulation type, a transmission power, a minimum central frequency, a maximum central frequency, a minimum input power, a maximum input power, or a signal-to-noise ratio threshold;
   receiving, by the first optical node from the second optical node, in response to the negotiation request message, a negotiation response message including an indication of support for the configuration parameter setting for the configuration parameter for optical transceivers;
   configuring, by the first optical node, in response to the indication of support, a configuration parameter of an optical transceiver for the first optical node with the configuration parameter setting for the configuration parameter; and
   outputting, by the first optical node to the second optical node, a negotiation update message that specifies an updated configuration parameter setting for the configuration parameter for optical transceivers that is different from the configuration parameter setting for the configuration parameter of the negotiation request message, wherein the negotiation update message includes an update reason, a link status, and timing information.

2. The method of claim 1, further comprising:
   outputting, by the first optical node via a shared optical link with the second optical node, data via the optical transceiver of the first optical node, the optical transceiver of the first optical node operating according to the configuration parameter setting for the configuration parameter.

3. The method of claim 1,
   wherein the configuration parameter setting comprises a first configuration parameter setting for the configuration parameter and a second configuration parameter setting for the configuration parameter,
   wherein the indication of support for the configuration parameter setting comprises an indication of support for the first configuration parameter setting, and
   wherein configuring the configuration parameter of the first optical node comprises configuring, by the first optical node, in response to the indication of support for the first configuration parameter setting, the configuration parameter of the first optical node with the first configuration parameter setting.

4. The method of claim 1, wherein the configuration parameter comprises a FEC scheme.

5. The method of claim 1, wherein the negotiation response message includes a field that includes a value that is the indication of support for the configuration parameter setting for the configuration parameter for optical transceivers.

6. The method of claim 1, wherein the indication of support indicates that the second optical node does not support the configuration parameter setting, and wherein the first optical node does not configure the configuration parameter of the optical transceiver for the first optical node with the configuration parameter setting for the configuration parameter in response to the indication that the second optical node does not support the configuration parameter setting.

7. The method of claim 1, further comprising:
   receiving, by the first optical node from the second optical node, in response to the negotiation update message, a subsequent negotiation response message including an indication of support for the updated configuration parameter setting for the configuration parameter for optical transceivers;
   outputting, by the first optical node, a negotiation confirmation message indicating confirmation by the first optical node of the updated configuration parameter setting; and
   configuring, by the first optical node, in response to the indication of support for the updated configuration parameter setting, a configuration parameter of the optical transceiver for the first optical node with the updated configuration parameter setting for the configuration parameter.

8. The method of claim 1, further comprising:
   outputting, by the first optical node to the second optical node, a negotiation query message that indicates a request for the configuration parameter setting for the configuration parameter for optical transceivers;
   receiving, by the first optical node from the second optical node, in response to the negotiation query message, a negotiation answer message including the configuration parameter setting for the configuration parameter that is configured in the second optical node.

9. A method comprising:
   outputting, by a first optical node to a second optical node, a negotiation request message that specifies a configuration parameter setting for a configuration parameter for optical transceivers, wherein the configuration parameter comprises one of a speed, a forward error correction (FEC) scheme, a modulation type, a transmission power, a minimum central frequency, a maximum central frequency, a minimum input power, a maximum input power, or a signal-to-noise ratio threshold;
   receiving, by the first optical node from the second optical node, in response to the negotiation request message, a negotiation response message including an indication of support for the configuration parameter setting for the configuration parameter for optical transceivers;
   configuring, by the first optical node, in response to the indication of support, a configuration parameter of an optical transceiver for the first optical node with the configuration parameter setting for the configuration parameter; and
   outputting, by the first optical node, a negotiation confirmation message indicating confirmation by the first optical node of the configuration parameter setting,
   wherein configuring the configuration parameter of the optical transceiver for the first optical node with the configuration parameter setting for the configuration parameter comprises configuring, after outputting the negotiation confirmation message, the configuration parameter of the optical transceiver for the first optical node with the configuration parameter setting for the configuration parameter.

10. A method comprising:
    outputting, by a first optical node to a second optical node, a negotiation request message that specifies a configuration parameter setting for a configuration parameter for optical transceivers, wherein the configuration parameter comprises one of a speed, a forward error correction (FEC) scheme, a modulation type, a transmission power, a minimum central frequency, a maximum central frequency, a minimum input power, a maximum input power, or a signal-to-noise ratio threshold;

receiving, by the first optical node from the second optical node, in response to the negotiation request message, a negotiation response message including an indication of support for the configuration parameter setting for the configuration parameter for optical transceivers; and configuring, by the first optical node, in response to the indication of support, a configuration parameter of an optical transceiver for the first optical node with the configuration parameter setting for the configuration parameter, wherein the negotiation request message comprises an Ethernet frame for an Ethernet management protocol.

11. The method of claim 10, wherein the Ethernet frame includes an EtherType value and a SubType value, wherein a combination of the EtherType value and the SubType value indicate the negotiation request message is for an optical parameter negotiation protocol.

12. A method comprising:
outputting, by a first optical node to a second optical node, a negotiation request message that specifies a configuration parameter setting for a configuration parameter for optical transceivers, wherein the configuration parameter comprises one of a speed, a forward error correction (FEC) scheme, a modulation type, a transmission power, a minimum central frequency, a maximum central frequency, a minimum input power, a maximum input power, or a signal-to-noise ratio threshold;

receiving, by the first optical node from the second optical node, in response to the negotiation request message, a negotiation response message including an indication of support for the configuration parameter setting for the configuration parameter for optical transceivers;

configuring, by the first optical node, in response to the indication of support, a configuration parameter of an optical transceiver for the first optical node with the configuration parameter setting for the configuration parameter; and prior to outputting the negotiation request message, configuring, by the first optical node, the configuration parameter of the optical transceiver for the first optical node with a baseline configuration parameter setting, wherein outputting the negotiation request message comprises outputting the negotiation request message via the optical transceiver for the first optical node operating according to the baseline configuration parameter setting for the configuration parameter.

13. The method of claim 12, wherein the configuration parameter setting is different than the baseline configuration parameter setting.

14. A method comprising:
receiving, by a first optical node from a second optical node, a negotiation request message that specifies a configuration parameter setting for a configuration parameter for optical transceivers, wherein the configuration parameter comprises one of a speed, a forward error correction (FEC) scheme, a modulation type, a transmission power, a minimum central frequency, a maximum central frequency, a minimum input power, a maximum input power, or a signal-to-noise ratio threshold;

outputting, from the first optical node to the second optical node, in response to the negotiation request message, a negotiation response message including an indication of support for the configuration parameter setting for the configuration parameter for optical transceivers;

configuring, by the first optical node, in response to the indication of support, a configuration parameter of an optical transceiver for the first optical node with the configuration parameter setting for the configuration parameter; and receiving, by the second optical node from the first optical node, a negotiation update message that specifies an updated configuration parameter setting for the configuration parameter for optical transceivers that is different from the configuration parameter setting for the configuration parameter of the negotiation request message, wherein the negotiation update message includes an update reason, a link status, and timing information.

15. The method of claim 14, further comprising:
receiving, by the first optical node from the second optical node, a negotiation confirmation message indicating confirmation by the second optical node of the configuration parameter setting for the configuration parameter, wherein configuring the configuration parameter of the optical transceiver for the first optical node with the configuration parameter setting for the configuration parameter comprises configuring, in response to receiving the negotiation confirmation message, the configuration parameter of the optical transceiver for the first optical node with the configuration parameter setting for the configuration parameter.

16. The method of claim 14, wherein the negotiation request message comprises an Ethernet frame for an Ethernet management protocol, wherein the Ethernet frame includes an EtherType value and a SubType value, wherein a combination of the EtherType value and the SubType value indicate the negotiation request message is for an optical parameter negotiation protocol.

17. The method of claim 14, wherein the configuration parameter setting comprises a first configuration parameter setting for the configuration parameter and a second configuration parameter setting for the configuration parameter, the method further comprising:
selecting, by the first optical node, the first configuration parameter setting from the first configuration parameter setting and the second configuration parameter setting, and wherein configuring the configuration parameter of the first optical node comprises configuring, by the first optical node in responding to the selecting, the configuration parameter of the first optical node with the first configuration parameter setting for the configuration parameter.

18. The method of claim 14, wherein the configuration parameter comprises a FEC scheme.

19. A method comprising:
receiving, by a first optical node from a second optical node, a negotiation request message that specifies a configuration parameter setting for a configuration parameter for optical transceivers, wherein the configuration parameter comprises one of a speed, a forward error correction (FEC) scheme, a modulation type, a transmission power, a minimum central frequency, a maximum central frequency, a minimum input power, a maximum input power, or a signal-to-noise ratio threshold;

outputting, from the first optical node to the second optical node, in response to the negotiation request message, a negotiation response message including an indication of support for the configuration parameter setting for the configuration parameter for optical transceivers;

configuring, by the first optical node, in response to the indication of support, a configuration parameter of an optical transceiver for the first optical node with the configuration parameter setting for the configuration parameter; and receiving, by the first optical node via a shared optical link with the second optical node, data via the optical transceiver of the second optical node, the optical transceiver of the second optical node operating according to the configuration parameter setting for the configuration parameter.

20. A system comprising:
a first optical node configured to:
 output a negotiation request message that specifies a configuration parameter setting for a configuration parameter for optical transceivers, wherein the configuration parameter comprises one of a speed, a forward error correction (FEC) scheme, a modulation type, a transmission power, a minimum central frequency, a maximum central frequency, a minimum input power, a maximum input power, or a signal-to-noise ratio threshold;
 receive, from a second optical node, in response to the negotiation request message, a negotiation response message including an indication of support for the configuration parameter setting for the configuration parameter for optical transceivers;
 configure, in response to the indication of support, a configuration parameter of an optical transceiver for the first optical node with the configuration parameter setting for the configuration parameter; and
 output, by the first optical node via a shared optical link with the second optical node, data via the optical transceiver of the first optical node, the optical transceiver of the first optical node operating according to the configuration parameter setting for the configuration parameter; and the second optical node configured to:
 receive the negotiation request message;
 output, in response to the negotiation request message, the negotiation response message; and
 configure, in response to the indication of support, a configuration parameter of an optical transceiver for the second optical node with the configuration parameter setting for the configuration parameter.

* * * * *